(12) United States Patent
Borkgren (10) Patent No.: US 10,934,106 B2
(45) Date of Patent: Mar. 2, 2021

(54) AGRICULTURAL VEHICLE PNEUMATIC DISTRIBUTION SYSTEM

(71) Applicant: Deere & Company, Moline, IL (US)

(72) Inventor: Stanley R. Borkgren, Geneseo, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 16/554,754

(22) Filed: Aug. 29, 2019

(65) Prior Publication Data

US 2019/0382216 A1   Dec. 19, 2019

Related U.S. Application Data (62) Division of application No. 15/950,497, filed on Apr. 11, 2018, now Pat. No. 10,457,500, which is a
(Continued)

(51) Int. Cl.
*B65G 53/52* (2006.01)
*B65G 53/04* (2006.01)
(Continued)

(52) U.S. Cl.
CPC .............. *B65G 53/04* (2013.01); *A01C 7/082* (2013.01); *A01C 15/04* (2013.01); *A01C 7/081* (2013.01)

(58) Field of Classification Search
CPC ...... B65G 53/08; B65G 53/528; B65G 53/04; A01C 7/042; A01C 7/082; A01C 7/084;
(Continued)

(56) References Cited

U.S. PATENT DOCUMENTS

| 2,538,756 A | * | 1/1951 | Braswell ................ A01C 7/082 |
| | | | 239/654 |
| 3,604,126 A | | 9/1971 | Whelan |

(Continued)

FOREIGN PATENT DOCUMENTS

| EP | 0368022 A2 | 5/1990 |
| GB | 2013464 A | 8/1979 |
| WO | 2013130005 A1 | 9/2013 |

OTHER PUBLICATIONS

European Extended Search Report Application No. 18189578.4, dated Feb. 15, 2017, 8 pages.
(Continued)

*Primary Examiner* — Joseph A Dillon, Jr.
(74) *Attorney, Agent, or Firm* — Christopher J. Volkmann; Kelly, Holt & Christenson, PLLC (57) ABSTRACT

A pneumatic distribution system for an agricultural machine includes an air source having an outlet, an assembly configured to receive agricultural material from a material source, and a plurality of conduits. Each conduit is configured to receive an air stream from the outlet for conveying a portion of the agricultural material to at least one device associated with the agricultural machine. A first one of conduits corresponds to a first distribution line and is positioned such that the first conduit receives a first air stream from a first area of the outlet, a second one of the conduits corresponds to a second distribution line and is positioned such that the second conduit receives a second air stream from a second area of the outlet having a lower air pressure than the first area, and the first distribution line has a higher pressure drop than the second distribution line.

19 Claims, 11 Drawing Sheets

Related U.S. Application Data division of application No. 14/861,374, filed on Sep. 22, 2015, now Pat. No. 9,969,569.

(51) Int. Cl.
  *A01C 7/08* (2006.01)
  *A01C 15/04* (2006.01)

(58) Field of Classification Search
  CPC ... A01C 15/04; F16L 41/007; Y10T 137/8593
  USPC .... 406/39, 41, 123, 181, 182, 183; 111/174, 111/175; 137/561 A
  See application file for complete search history.

(56) References Cited

U.S. PATENT DOCUMENTS

| | | | |
|---|---|---|---|
| 3,724,522 A * | 4/1973 | Pogson | C02F 1/08 |
| | | | 159/13.3 |
| 4,085,776 A * | 4/1978 | Derrick, Jr. | F15D 1/001 |
| | | | 137/561 A |
| 4,528,919 A * | 7/1985 | Harbolt | A01C 23/024 |
| | | | 111/175 |
| 4,569,486 A | 2/1986 | Balmer | |
| 4,741,630 A | 5/1988 | Oeynhausen et al. | |
| 4,793,744 A | 12/1988 | Montag | |
| 4,856,968 A | 8/1989 | Armbruster | |
| 5,018,910 A | 5/1991 | Weiss | |
| 5,101,847 A * | 4/1992 | Oribe | F24F 7/06 |
| | | | 137/1 |
| 5,125,583 A | 6/1992 | Strand | |
| 5,341,841 A * | 8/1994 | Schaefer | F15B 13/081 |
| | | | 137/561 A |
| 5,765,381 A | 6/1998 | Renz | |
| 5,775,585 A | 7/1998 | Duello | |
| 5,908,032 A | 6/1999 | Poindexter et al. | |
| 5,950,933 A | 9/1999 | Balmer | |
| 5,979,343 A | 11/1999 | Gregor et al. | |
| 6,283,679 B1 | 9/2001 | Gregor et al. | |
| 6,945,266 B2 * | 9/2005 | de Tezanos Pinto | F15D 1/04 |
| | | | 137/14 |
| 7,168,448 B2 * | 1/2007 | Schmidt | F28B 1/06 |
| | | | 137/561 A |
| 7,537,375 B2 | 5/2009 | Hoff et al. | |
| 7,708,145 B2 | 5/2010 | Li et al. | |
| 7,789,921 B2 | 9/2010 | Thurin et al. | |
| 8,014,696 B2 | 9/2011 | Igarashi | |
| 8,281,809 B1 * | 10/2012 | Wise | G01N 15/06 |
| | | | 137/601.18 |
| 8,357,232 B1 * | 1/2013 | Morrison | B01D 53/24 |
| | | | 95/271 |
| 8,498,548 B2 | 7/2013 | Nishikawa et al. | |
| 8,678,530 B2 * | 3/2014 | Wilson | F25D 23/064 |
| | | | 312/401 |
| 8,707,989 B2 * | 4/2014 | Pucciani | F16L 3/16 |
| | | | 137/561 A |
| 9,119,339 B2 | 9/2015 | Bergere | |
| 9,387,997 B2 * | 7/2016 | Hu | B65G 53/523 |
| 9,504,199 B2 | 11/2016 | Wistrand et al. | |
| 9,546,051 B2 * | 1/2017 | Roberge | B65G 53/04 |
| 9,593,686 B2 | 3/2017 | DeWald et al. | |
| 9,968,029 B2 | 5/2018 | Funck | |
| 9,969,569 B2 | 5/2018 | Borkgren | |
| 10,244,673 B2 * | 4/2019 | Henry | A01C 15/04 |
| 10,421,623 B2 * | 9/2019 | Hui | B65G 53/34 |
| 10,486,919 B2 * | 11/2019 | Hui | A01C 7/081 |
| 10,676,291 B2 * | 6/2020 | Hui | B65G 53/34 |
| 2005/0083985 A1 | 4/2005 | Egawa et al. | |
| 2007/0199175 A1 | 8/2007 | Syracuse et al. | |
| 2008/0184991 A1 | 8/2008 | Krupp | |
| 2009/0253360 A1 | 10/2009 | Tafoya | |
| 2011/0139889 A1 | 6/2011 | Ohtsuka et al. | |
| 2011/0280748 A1 | 11/2011 | O'Connor, Jr. et al. | |
| 2012/0174843 A1 | 7/2012 | Friggstad | |
| 2013/0025455 A1 | 1/2013 | Morrison | |
| 2015/0030420 A1 | 1/2015 | Wistrand et al. | |
| 2015/0041675 A1 | 2/2015 | Shibata et al. | |
| 2015/0189827 A1 | 7/2015 | Gilstring | |
| 2015/0190801 A1 | 7/2015 | Yokoi et al. | |
| 2015/0336035 A1 | 11/2015 | Floan et al. | |
| 2015/0344242 A1 | 12/2015 | Celella | |
| 2015/0359920 A1 | 12/2015 | Ohtsuka et al. | |
| 2016/0081262 A1 | 3/2016 | Roberge | |
| 2016/0081272 A1 | 3/2016 | Ryse et al. | |
| 2016/0100525 A1 | 4/2016 | Veikle et al. | |
| 2016/0157419 A1 | 6/2016 | Henry et al. | |
| 2016/0205866 A1 | 7/2016 | Funck | |
| 2016/0290635 A1 | 10/2016 | Frenette et al. | |
| 2017/0079198 A1 | 3/2017 | Borkgren | |
| 2018/0229946 A1 | 8/2018 | Borkgren | |
| 2019/0382217 A1 | 12/2019 | Borkgren | |

OTHER PUBLICATIONS

Prosecution History for U.S. Appl. No. 14/861,374 including: Corrected Notice of Allowance dated Feb. 21, 2018, Notice of Allowance dated Feb. 9, 2018, Amendment dated Nov. 30, 2017, Non-Final Office Action dated Aug. 16, 2017, Response to Restriction Requirement dated Jul. 27, 2017, Restriction Requirement dated Jun. 6, 2017, and Preliminary Amendment dated Oct. 8, 2015, 81 pages.

Prosecution History for U.S. Appl. No. 15/950,497 including: Response to Ex Parte Quayle Action dated Jul. 17, 2019, Ex Parte Quayle Action dated May 21, 2019, Amendment dated May 8, 2019, Non-Final Office Action dated Jan. 8, 2019, Response to Restriction Requirement dated Nov. 7, 2018, Restriction Requirement dated Oct. 26, 2018, and Application and Drawings filed Apr. 11, 2018, 59 pages.

Notice of Allowance for U.S. Appl. No. 15/950,497 dated Aug. 21, 2019, 5 pages.

Non-Final Office Action for U.S. Appl. No. 16/554,761, dated Jul. 10, 2020, 9 pages.

Amendment for U.S. Appl. No. 16/554,761 dated Oct. 12, 2020, 12 pages.

Notice of Allowance for U.S. Appl. No. 16/554,761, dated Nov. 4, 2020, 7 pages.

* cited by examiner

AGRICULTURAL VEHICLE PNEUMATIC DISTRIBUTION SYSTEM

CROSS-REFERENCE TO RELATED APPLICATIONS

The present application is a divisional of and claims priority to U.S. patent application Ser. No. 15/950,497, filed Apr. 11, 2018, which is a divisional of and claims priority to U.S. patent application Ser. No. 14/861,374, filed Sep. 22, 2015, the contents of which are hereby incorporated by reference in their entirety.

FIELD OF THE DESCRIPTION

The present description relates to agricultural equipment. More specifically, but not by limitation, the present description relates to a pneumatic distribution system for agricultural vehicles.

BACKGROUND

Agricultural vehicles or other equipment often include a pneumatic distribution system for distributing product to one or more end points. In an air seeder, for example, an air distribution system comprises an air source that provides air flow to a plurality of distribution lines or runs. A metering system, such as a volumetric meter, can be used to meter product (e.g., seed, fertilizer, etc.) into the air flow. In one example, the air distribution system employs a plenum that couples the plurality of distribution lines to the output of the air source in a manner that provides equal air pressure to each distribution line.

The discussion above is merely provided for general background information and is not intended to be used as an aid in determining the scope of the claimed subject matter.

SUMMARY

A pneumatic distribution system for an agricultural machine includes an air source having an outlet, an assembly configured to receive agricultural material from a material source, and a plurality of conduits. Each conduit is configured to receive an air stream from the outlet for conveying a portion of the agricultural material to at least one device associated with the agricultural machine. A first one of conduits corresponds to a first distribution line and is positioned such that the first conduit receives a first air stream from a first area of the outlet, a second one of the conduits corresponds to a second distribution line and is positioned such that the second conduit receives a second air stream from a second area of the outlet having a lower air pressure than the first area, and the first distribution line has a higher pressure drop than the second distribution line.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
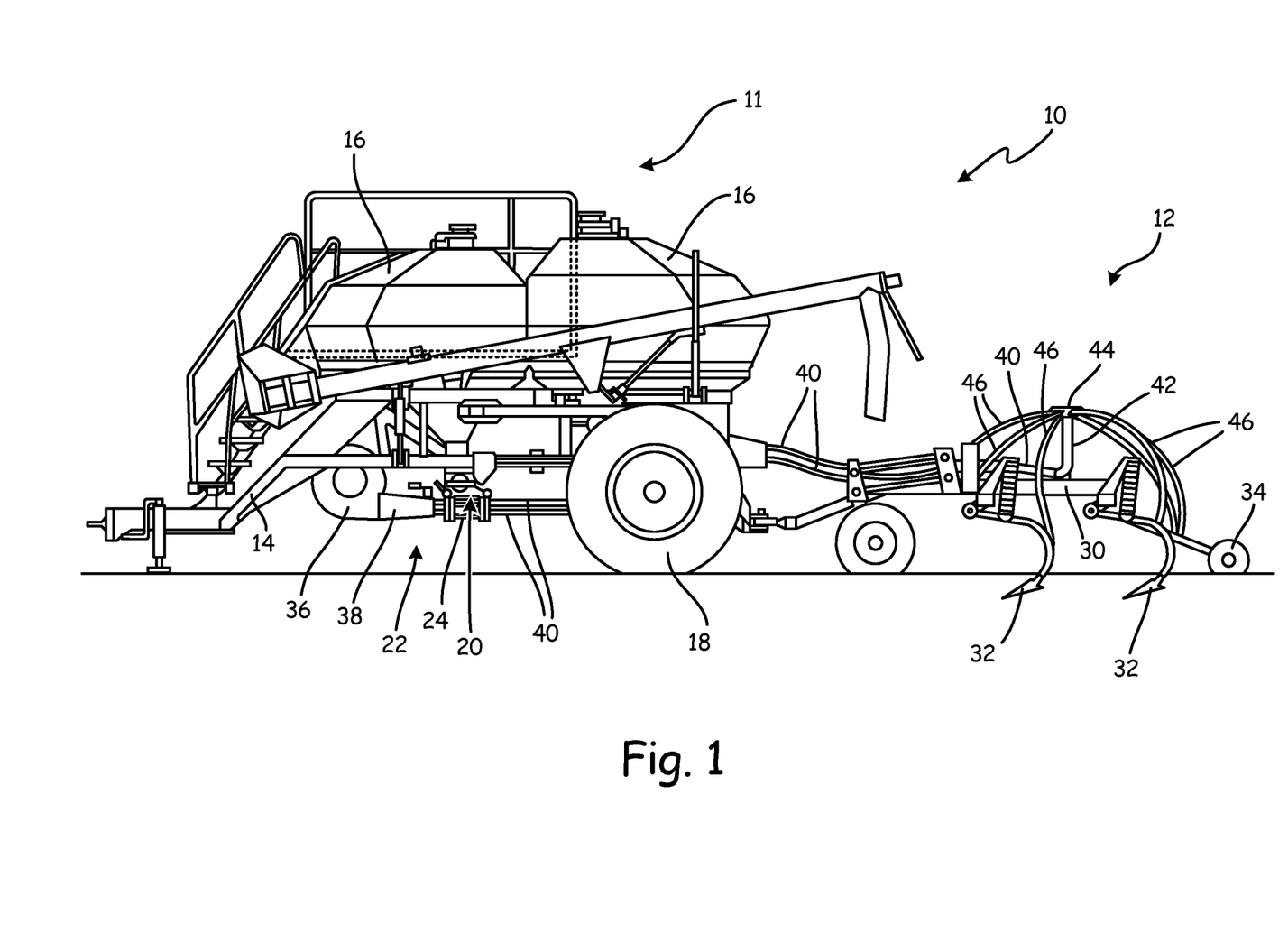
FIG. 1 illustrates a side view of one example of an agricultural vehicle with a pneumatic distribution system for pneumatically distributing agricultural product.

FIG. 1 illustrates a side view of one example of an agricultural vehicle with a pneumatic distribution system for pneumatically (e.g., air or other gas) distributing agricultural product in the form of particulate material (e.g. seed, fertilizer, etc.). In the illustrated example, the vehicle comprises an air seeder 10 that pneumatically delivers seed and/or fertilizer to ground engaging openers. Of course, a pneumatic distribution system can be utilized with other types of vehicles as well.

Seeder 10 comprises a seed cart 11 towed between, for example, a tractor (not shown) and a tilling implement 12. The seed cart 11 also includes a frame 14 to which product tanks 16 and wheels 18 are mounted. Each product tank 16 includes an associated metering system 20 at its lower end for controlled feeding of a product into a pneumatic distribution system 22. The metering system 20, is adjacent to a discharge end of a product tank 16. The tilling implement 12, towed behind the seed cart 11, comprises a frame 30 to which ground openers 32 are mounted. Incorporation of seed row finishing equipment, such as closing wheels 34, can also be utilized, in one example.

Pneumatic distribution system 22 includes an air source 36, such as, but not limited to, a fan, blower, compressor, and/or pump. In the illustrated example, air source 36 comprises a centrifugal fan (also referred to as centrifugal fan 36) connected to a plenum 38, which in turn is connected through one or more conduits to one or more primary distribution manifolds 24. Each manifold 24 is configured to receive product from one of product tanks 16 that is metered through metering system 20. In one example, metering system 20 comprises one or more volumetric meters that volumetrically meters product into distribution system 22.

Each individual passage in the primary distribution manifold 24 is connected by a distribution line 40 to a riser tube 42. However, while only one riser tube 42 is shown in FIG. 1, in another example, multiple riser tubes 42 can be utilized. Each riser tube 42 is, in turn, coupled to a secondary distribution header 44. One or more distribution lines 46 connect the secondary distribution header 44 to seed boots (not shown) mounted on the ground openers 32 to deliver product (e.g. seed or fertilizer) to a furrow formed by the openers 32.

While seeder 10 of FIG. 1 is shown as a separate seed cart 11 connected to tilling implement 12, in one example, the product tank 16, metering system 20 and pneumatic distribution system 22 can be mounted on the same frame as the ground openers 32. Further, while air source 36 is described herein as providing a source of air, source 36 can be configured to provide a flow of other types of distribution gasses as well.

Figure 2:
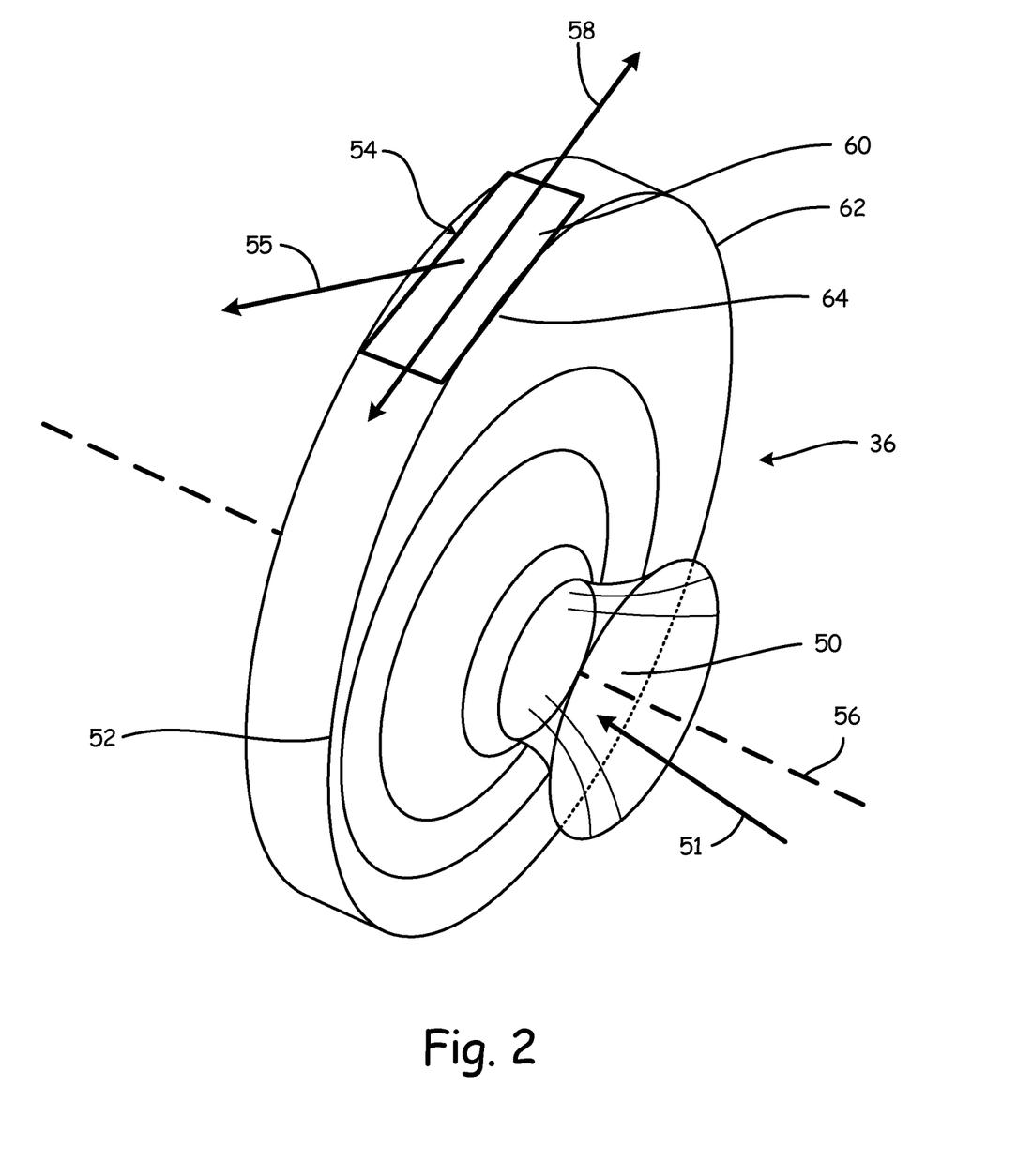
FIG. 2 illustrates one example of an air source.

FIG. 2 illustrate one example of centrifugal fan 36. As shown in FIG. 2, which is a perspective of fan 36, an inlet port 50 receives air (generally represented by arrow 51), which is moved through a housing 52 to an outlet 54 by impellers or rotating blades that rotate about a fan axis 56.

The air exits outlet 54 (generally represented by arrow 55) with different air pressures that define a pressure gradient across outlet 54. That is, depending on the configuration of the fan, some areas or pressure zones have higher pressures than other areas in outlet 54. In the example centrifugal fan 36, a pressure gradient is defined along a pressure axis 58, where high pressure areas 60 are located near an outer periphery 62 (i.e., further away from axis 56) and low pressure areas 64 are located more closely to axis 56. While the air source is illustrated as a centrifugal fan in FIGS. 1 and 2, other types of air sources can be utilized that have pressure gradients.

In one example air distribution system design, a large plenum box is affixed to the outlet of the air source to mitigate the different pressures along the pressure gradient, thereby providing substantially equal pressures to the distribution paths. For example, the plenum box can be configured such that static pressure at each primary outlet of the plenum is substantially equal.

However, in some applications, the lengths of the distribution lines are significantly different. For example, referring again to air seeder 10, some distribution lines 40 have different lengths from the air source 36 depending on the particular endpoints (e.g., row unit). In one example, distribution lines 40 can vary up to 30 feet, or more. For instance, a distribution line to an inner row unit can be 30 feet long, whereas a distribution line to an outer row unit can be 50 feet long. This, of course, is an example only.

In any case, some distribution lines 40 have different pressure drops due to the length differences, or other factors. This results in an uneven pressure loss, and different volumetric flow rates at the end points, which can affect seed spacing, yields, etc. In one attempt to provide equal flow rates to all row units (i.e., to limit row to row variation in seed application), undesired pressure loss variation between distribution lines is reduced by restricting flow in the shorter lines in order to equalize the pressure loss across all distribution lines. For example, in one implementation a restricting damper, plate, orifice, or other device is placed in the shorter distribution lines so that the shorter distribution lines have a similar pressure drop compared to the longer distribution lines. However, such a configuration restricts commodity conveyance, decreases the overall efficiency of the fan, and increases the overall energy consumption and requirements to achieve a desired volumetric flow rate.

The present disclosure provides a pneumatic distribution system for pneumatically distributing material in an agricultural vehicle. The pneumatic distribution system comprises an air source having an outlet with different air pressures defining a pressure gradient across the outlet, and a plurality of inlet ports configured to receive air from the outlet for a plurality of distribution streams, comprising at least a first distribution stream with a first pressure loss value and a second distribution stream with a second pressure loss value that is greater than the first pressure loss value.

In one example, the inlet ports for the first and second distribution streams are located relative to the pressure gradient such that the second distribution stream receives a higher air pressure than the first distribution stream. In one example, the air pressure at the inlet for the second distribution stream is at least two times greater than the air pressure at the inlet for the first distribution stream. In one example, the air pressure at the inlet for the second distribution stream is at least three times greater than the air pressure at the inlet for the first distribution stream. In one example, the air pressure at the inlet for the second distribution stream is at least four times greater than the air pressure at the inlet for the first distribution stream. In one example, the air pressure at the inlet for the second distribution stream is at least five times greater than the air pressure at the inlet for the first distribution stream.

In one example, the plurality of distribution streams comprises a plurality of lines, or runs, to row units on an air seeder. As used herein, a "line" refers to a channel or path to an end point. For instance, a line can provide an air flow path to one or more row units. Further, a line can be formed by a plurality of separate elements connected together. For instance, a given line can comprise separate conduit(s), tube(s), manifold(s), meter(s), row unit(s), etc., coupled together to form a single distribution path from the air source to an end point.

Figure 3:
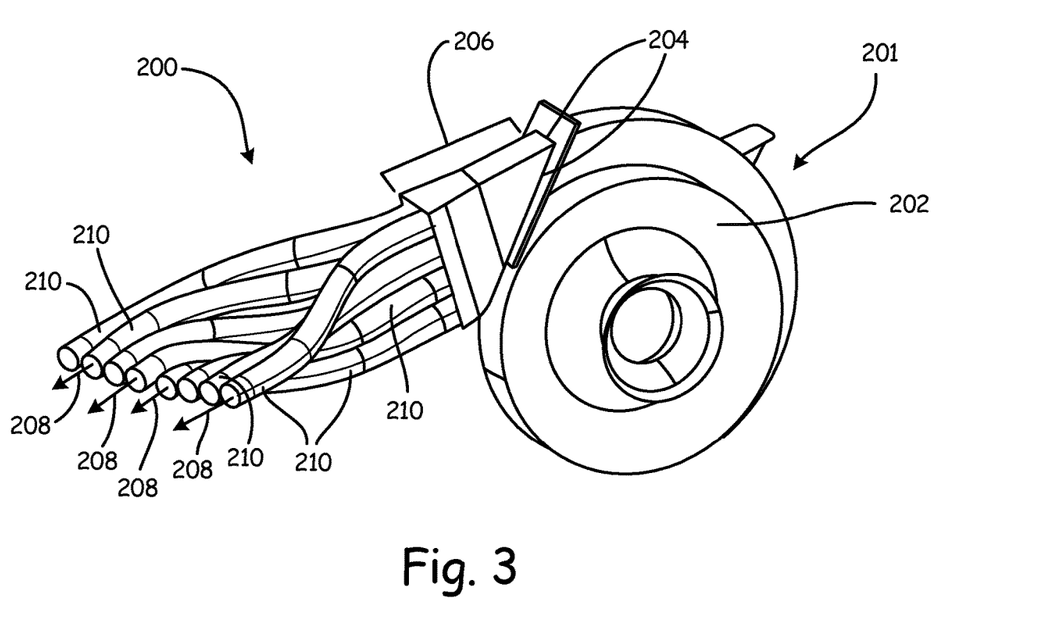
FIG. 3 illustrates an example air flow assembly for a pneumatic distribution system.

FIG. 3 illustrates one example of an air flow assembly 200 for use with a pneumatic distribution system. Assembly 200 is removably coupled to an air source 201 (e.g. fan 36), having a housing 202, at a connection interface 204. In one example, housing 202 is substantially similar to housing 52 illustrated in FIG. 2. While connection interfaces (e.g., interface 204) are herein illustrated as substantially flat or planar (also referred to as a connection plane—e.g., connection interface 204), in other examples a connection interface can be non-planar.

Assembly 200 includes a fixed, inflexible body portion 206, and a plurality of conduits 210 coupled to and extending from portion 206. Fixed portion 206 is coupled (removably or otherwise) on one end to housing 202 at connection interface 204 and, on a second end, to the plurality of conduits 212. Portion 206 and conduits 210 form a plurality of air flow paths for a respective air flow (generally represented by arrows 208) generated by source 201. Each air flow 208 forms a distribution stream.

As discussed in further detail below, assembly 200 includes a plurality of inlet ports configured to receive the air, from the outlet of source 201 at connection interface 204, for the plurality of distribution streams. Each distribution stream is provide to an end point (e.g., a row unit, meter, etc.) using one or more conduits, or other element(s). In one example, conduits 210 convey the air to a volumetric metering system (e.g., manifold 24 of system 20 illustrated in FIG. 1).

In the illustrated example, the inlet ports receive a section of the pressure gradient present at the outlet of source 201 such that the distribution streams having higher pressure drops receive higher air pressure from source 201 than distribution streams having lower pressure drops.

Figure 4A:
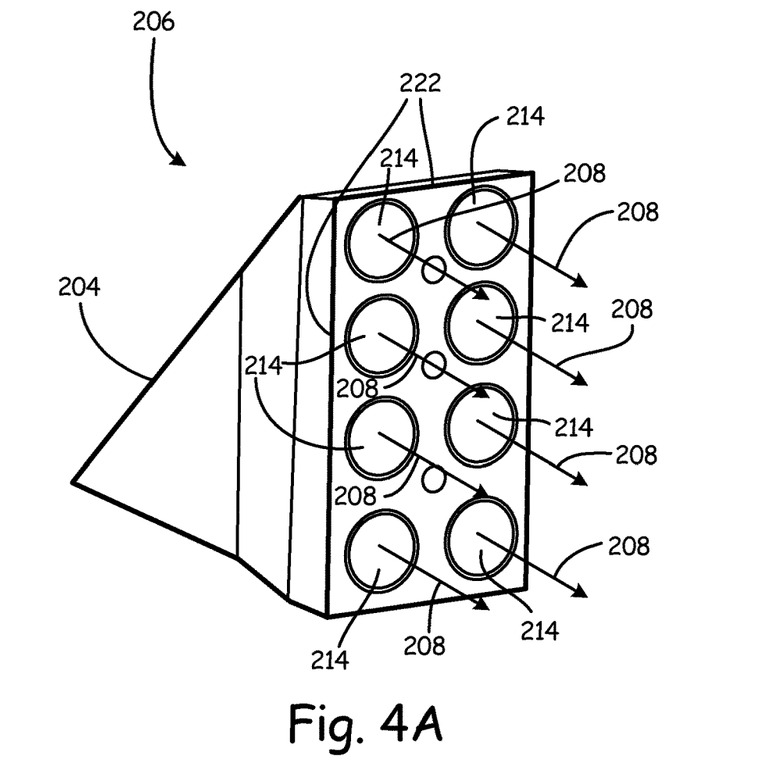
FIGS. 4A and 4B illustrate an example air flow assembly for a pneumatic distribution system.
Figure 4B:
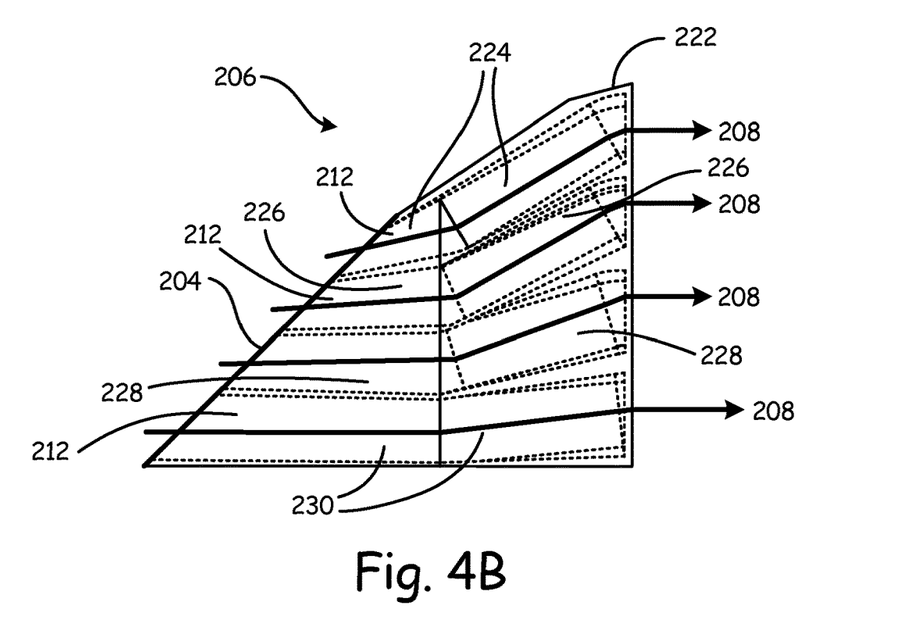
Figures 5A, 5B, 5C, 5D:
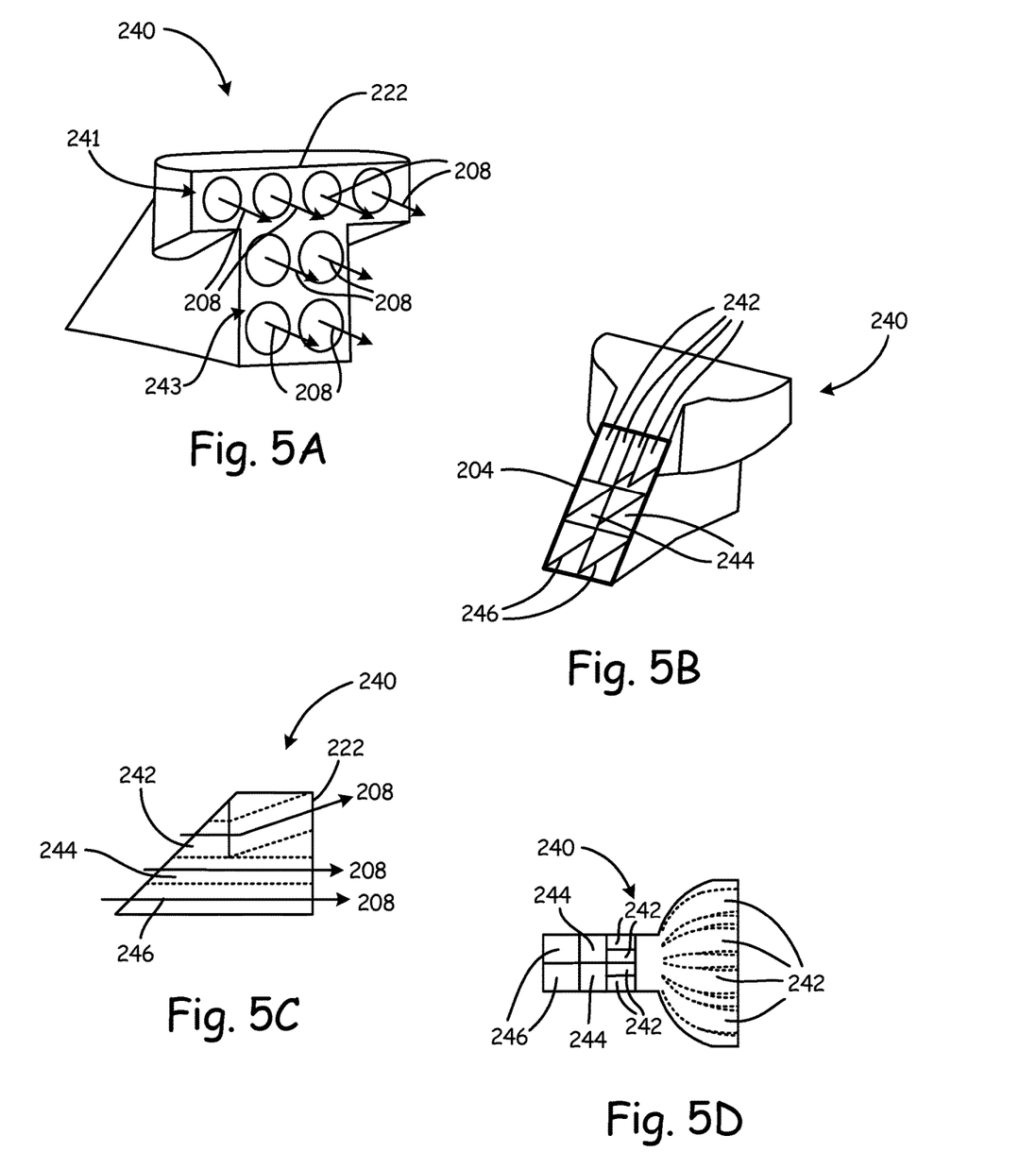
FIGS. 5A-5D illustrate an example air flow assembly for a pneumatic distribution system.
Figure 6A:
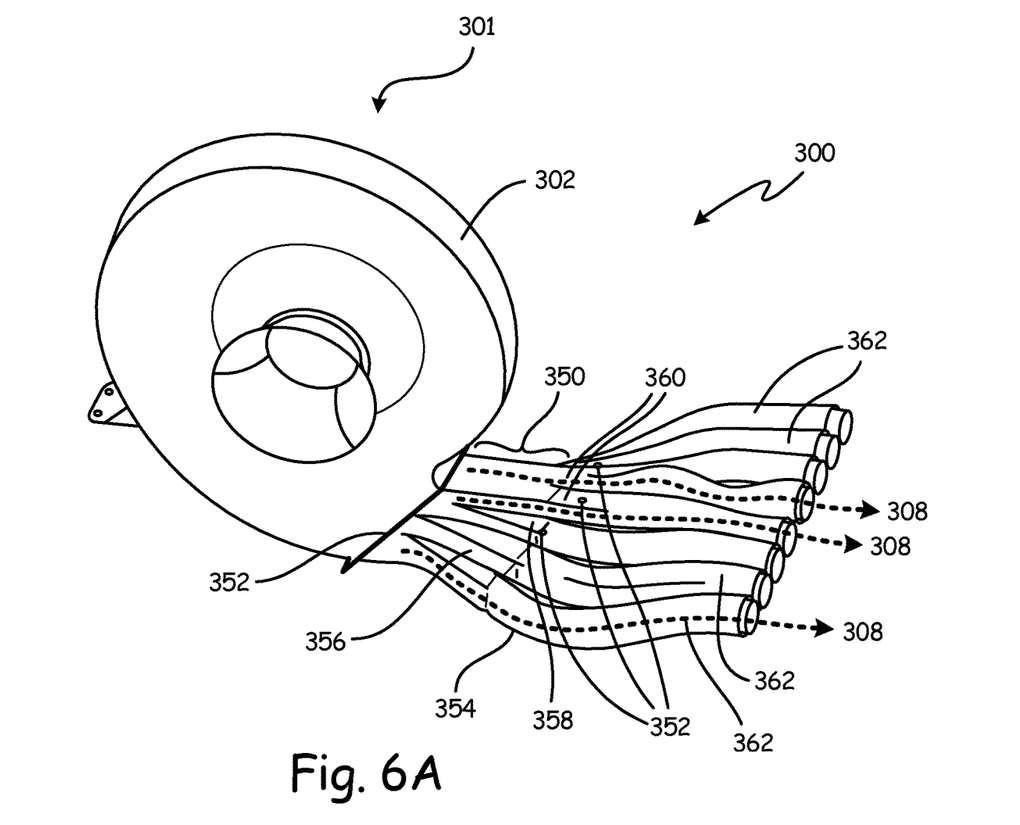
FIGS. 6A-6C illustrate an example air flow assembly for a pneumatic distribution system.
Figure 6B:
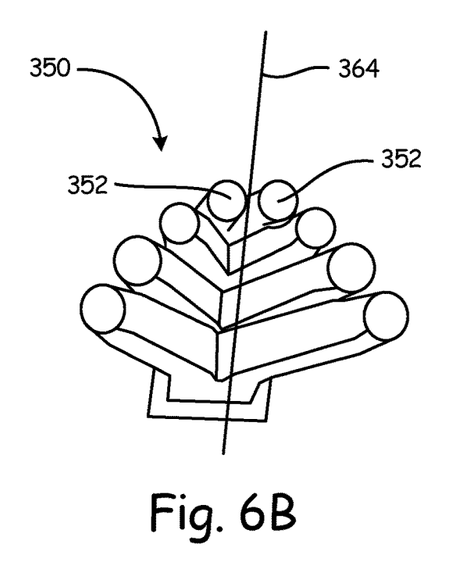
Figure 6C:
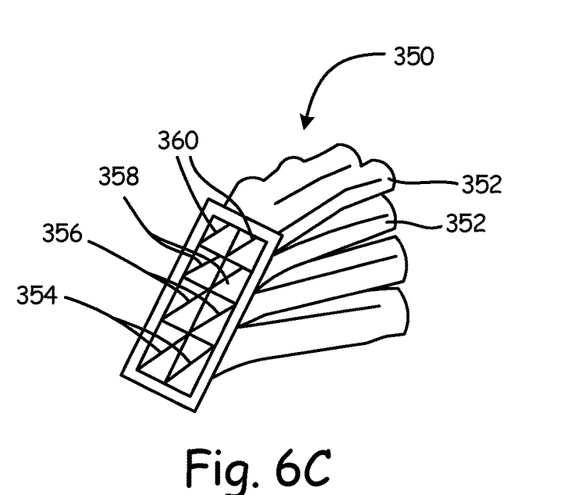

FIGS. 4A and 4B (collectively referred to as FIG. 4) illustrate one example of portion 206. At the connection interface 204, portion 206 includes a plurality of inlet apertures 212. Portion 206 also includes a plurality of outlet apertures 214 at a conduit connection side or interface 222, and a plurality of passageways 224, 226, 228, and 230 formed between the inlet and outlet apertures. Outlet apertures 214 are configured to receive and fluidically couple to conduits 210 (not shown in FIG. 4). It is noted that while the example of FIG. 4 illustrates apertures arranged in a symmetrical four by two configuration for eight flow paths, portion 206 can be configured in another of a number of ways (including asymmetrically), for any number of flow paths.

In the illustrated example, fixed portion 206 is configured such that the air from the air source outlet is segmented at the connection interface 204. That is, the inlet ports formed by apertures 212 are located at, or in close proximity to connection interface 204, and thus the air source outlet. This example configuration advantageously obtains air flow streams with a maximum, or near maximum, pressure differential between lines. That is, this configuration utilizes the pressure gradient at the air source outlet to distribution streams of differing air pressures.

As shown in FIGS. 3 and 4, passageways 224 are formed by apertures 212 that are positioned to receive air from a relatively low pressure area (e.g., lower pressure area 64 shown in FIG. 2) and passageways 230 are formed by apertures 212 that are positioned to receive air from a relatively high pressure area (e.g., high pressure areas 60 shown in FIG. 2). Passageways 226 and 228 are positioned between passageways 224 and 230, and are configured to receive air from pressure areas that are between the low and high pressure areas. In other words, passageways 230 each have a substantially similar air pressure, which is greater than the air pressure in passageways 228. Likewise, passageways 228 each have a substantially similar air pressure, which is greater than the air pressure in passageways 226. Likewise, passageways 226 each have a substantially similar air pressure, which is greater than the air pressure in passageways 224. As such, in the illustrated example, the passageways 224, 226, 228, and 230 that form the inlets to the distribution streams are arranged in continuum with passageways 224 receive the lowest pressure, passageways 230 receive the highest pressure, and passageways 226 and 228 are arranged in the continuum between the lowest and highest pressures.

Accordingly, conduits 210 are connected to portion 206 based on the relative pressure drops in the distribution streams provided by those conducts. For example, conduits 210 are connected to portion 206 such that longer distribution lines receive air from the outer diameter of source 201 (i.e., air with the highest dynamic pressure). The shortest distribution lines, on the other hand, receive air from an area of the air source outlet that is closest to the fan axis (i.e., air with the lowest dynamic pressure). The coefficient of variation between the distribution line air pressures can be adjusted by the position of the inlet ports relative to the outlet pressure gradient and/or the size of the inlet ports. For example, an air seeder implementation with a smaller distribution line length variation (i.e., a shorter implement width) utilizes a smaller pressure variation between lines than an air seeder implementation with a larger distribution line length variation.

Accordingly, in the illustrated example, configuring the distribution lines to receive air flows from the air source at different pressure values facilitates substantially balanced outlet pressures and flow rates among different distribution line lengths without increasing power consumption by the air source. Additionally, the example air flow assembly can reduce space requirements compared to a large plenum box, as discussed above.

Further, it is noted that the length of passageways 224, 226, 228, and 230 through portion 206 can be the same or different. In the example of FIG. 4, air source connection interface 204 is oriented at an angle with respect to a conduit connection interface 222. In another example, interfaces 204 and 222 can be substantially parallel to one another.

FIGS. 5A-5D (collectively referred to as FIG. 5) illustrate another example of a fixed portion 240 for an air flow assembly. Fixed portion 240 comprises eight air flow paths for respective air flows (generally represented in FIG. 5 by arrows 208), arranged in a "T-shaped" orientation. The T-shaped orientation comprises of a four by one arrangement 241 coupled to a two by two arrangement 243. The fixed portion 240 comprises an air source connection interface or plane 204 configured to couple to an air source, and a conduit connection interface or plane 222 configured to couple to a plurality of conduits (not shown in FIG. 5).

As shown in FIG. 5B, portion 240 comprises a plurality of passageways 242, 244, and 246 from between corresponding inlet and outlet apertures. The inlet apertures at air source connection interface 204 are substantially rectangular in shape, and have differing sizes. In another example, the inlet apertures can be substantially cylindrical and/or have similar sizes.

In FIGS. 5C and 5D, which are side and top views of portion 240, respectively, passageways 242, 244, and 246 are shown in phantom. A plurality of different inlet pressure zones present along connection interface 204 are utilized to form air flows 208 of differing pressures. In one example, the highest pressure air flows 208 originate from connection ports 246, and the lowest pressure air flow 208 originate from passageways 242.

Referring again to FIG. 3, in one example, conduits 210 are formed of flexible material(s) such that they can be maneuvered around structural or other components of the agricultural vehicle (i.e., seeder 10). In one example, conduits 210 comprise a substantially rigid portions movably coupled together by a plurality of joints.

FIGS. 6A-6C (collectively referred to as FIG. 6) illustrate another example of an air flow assembly 300 coupled to an air source 301 (e.g., fan 36), having a housing 302, at an air source connection interface 352. Assembly 300 includes a fixed portion 350 coupled to a plurality of conduits 362 at a conduit connection interface. Air source 301, in one example, is substantially similar to source 36.

As shown in FIGS. 6B and 6C, which illustrate front and rear perspective views, respectively, fixed portion 350 comprises a plurality of passageways 354, 356, 358, and 360 that separate air flows (generally represented by arrows 308) at or in close proximity to the air source outlet at interface 352, where the pressure gradient is greatest.

Passageways 354 draw air from the air source outlet that has a relative highest pressure, and passageways 360 draw air from the air source outlet that has the relative lowest pressure. The inlet apertures to passageways 354, 356, 358, and 360 are located along or in close proximity to interface 352. In the illustrated example, the inlet apertures have different cross-sectional areas. In another example, the cross-sectional areas can be substantially similar. The sizes of each inlet aperture can be configured based on the require air flow and pressure drops in the distribution lines.

FIGS. 7A-7D (collectively referred to as FIG. 7) illustrate another example of an air flow assembly 400 configured to be coupled to an air source (e.g., fan 36). FIGS. 7A and 7B are a side view and cross-sectional perspectival view, respectively. FIGS. 7C and 7D are end and exploded views, respectively.

As shown in FIG. 7, assembly 400 includes a mounting body 402 for mounting to the air source at an air source connection interface 404 and a conduit interface plate 406 configured to receive a plurality of conduits (not shown in FIG. 7) that form air flow paths for respective air flows (generally represented by arrows 408). Assembly 400 includes a premixing chamber or space 410 between the connection interface 404 and inlet ports 412, 414, and 416 for the distribution streams.

In the illustrated example, premixing chamber 410 facilitates premixing of the air from the air source outlet before entering, and being segmented by, ports 412, 414, and 416. This premixing reduces the pressure gradient to some extent (i.e., the pressures in the distribution streams are somewhat equalized). In other words, the pressure gradient at interface 404 is different than the pressure gradient at ports 412, 414, and 416. The amount that the pressure gradient is reduced can depend on the size of the premixing chamber 410 and distance between connection interface 404 and ports 412, 414, and 416. Premixing can be advantageous in implementations with a smaller distribution line length variation. To illustrate, in one example, the difference in air pressure between ports 412 and 416 is less than the difference in air pressure between passageways 226 and 228 in FIG. 4.

In the illustrated example, inlet ports 412, 414, and 416 are arranged in a symmetrical three by three configuration. Some or all of the inlet ports are fluidically coupled to conduits that provide product distribution lines. One or more of the inlet ports can be fluidically coupled to conduit(s) that provide air for other purposes. For example, inlet port 418 comprises a tank pressurization port that is coupled to a conduit that provides pressuring air for a tank (e.g, a seed tank, etc.). It is noted that other symmetrical or nonsymmetrical configurations can be utilized.

Figure 7A:
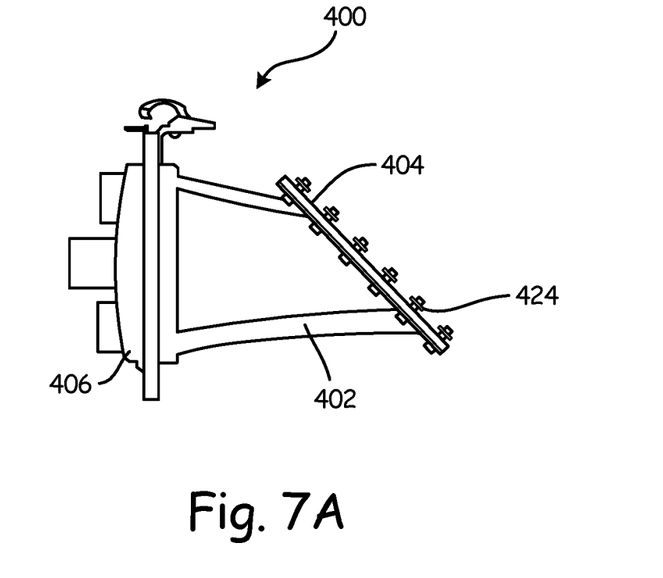
FIGS. 7A-7D illustrate an example air flow assembly for a pneumatic distribution system.
Figure 7B:
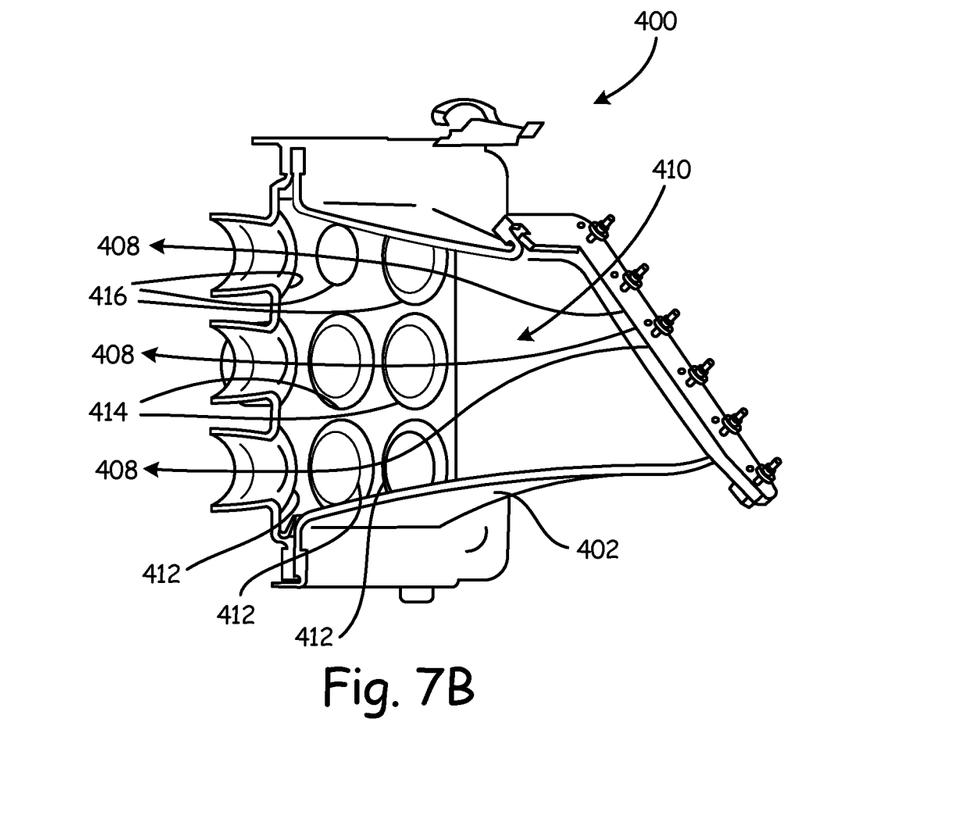
Figure 7C:
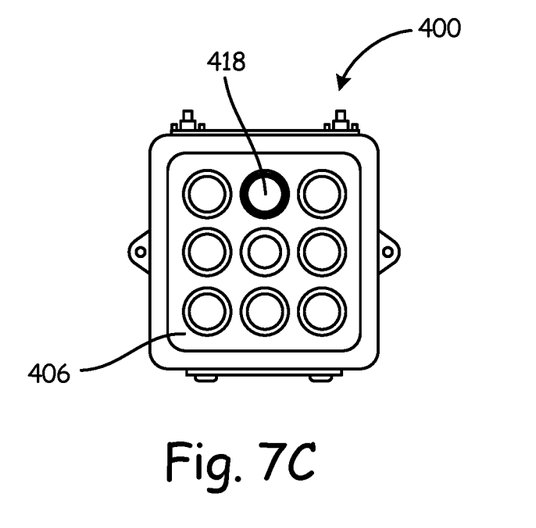
Figure 7D:
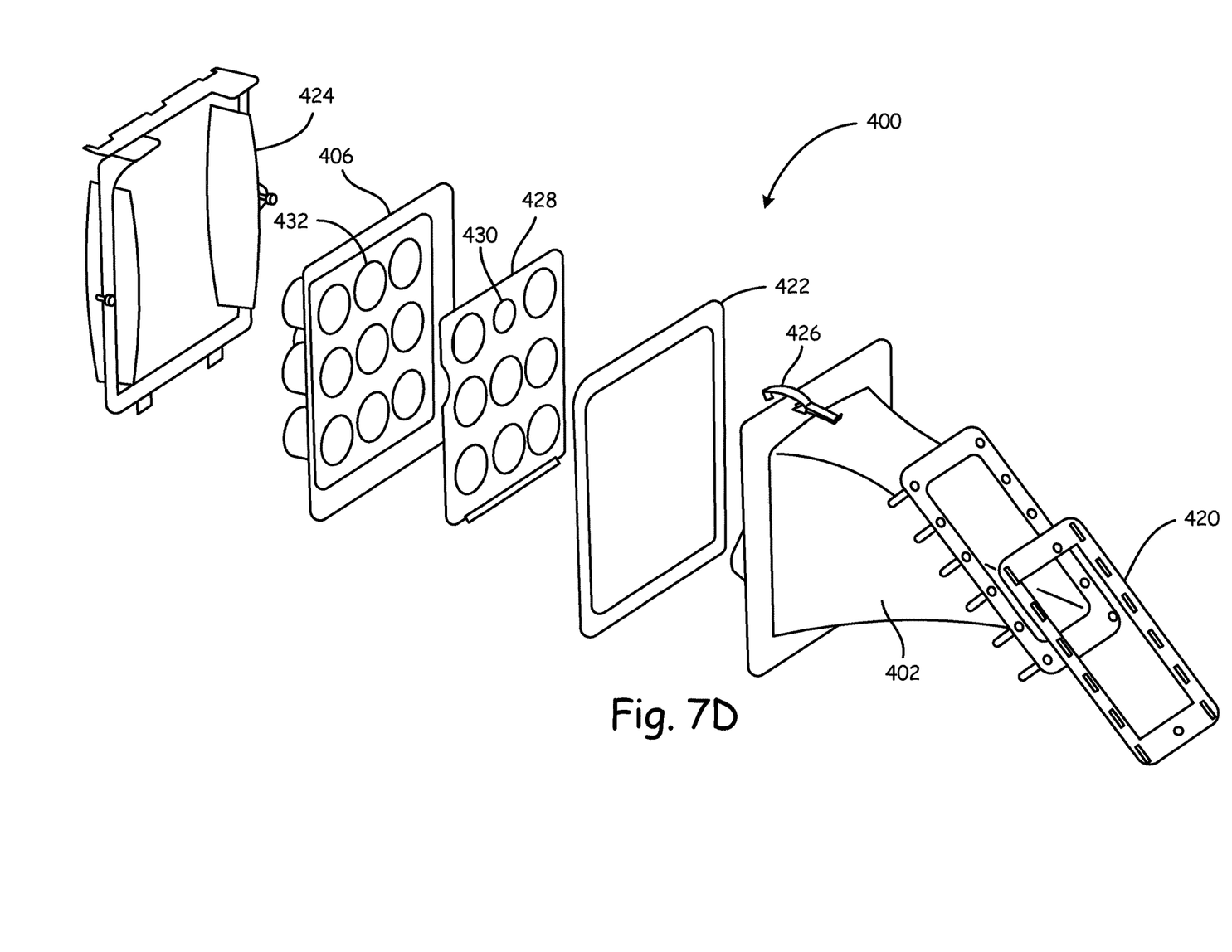

As shown in FIG. 7D, assembly 400 comprises one or more sealing interfaces, formed by gasket(s), o-ring(s), and/or another suitable sealing mechanism(s). For example, sealing interfaces 420 and 422, such as rubber gaskets, provided between body 402 and the air source, and between body 402 and plate 406, respectively. A cover 424 is removably coupled to body 402 using a latch 426. Cover 424 is positioned to retain plate 406 proximate premixing chamber 410.

In one example, an orifice plate 428 is positioned proximate conduit connection plate 406. Orifice plate 428 includes a plurality orifices aligned with the ports formed in plate 406. Some or all of the orifices have a substantially similar size in relation to the cross-section of the ports in plate 406. However, one or more of the orifices in orifice plate 428 can have a reduced size to restrict the air flow through the corresponding port in plate 406. In the example of FIG. 7D, an orifice 430 in plate 428 has a substantially smaller size than the corresponding orifice 432 in plate 406 to form pressurizing port 418.

In one example, orifice plate 428 is formed of metal (e.g., steel, etc.). The other components of assembly 400 can be formed of any suitable material(s) as well. In one example, body 402 conduit connection plate 406 and/or cover 424 can also be formed of plastic (e.g., polyethylene, etc.) and/or metal.

It is noted that, in one example, each of the air flow assemblies illustrated in FIGS. 3-7 are configured for use with a same or similar air source. As such, the air flow assemblies can be easily interchanged at the air source connection plane (e.g., interfaces 204, 352, 404, etc.) based on the particular application and distribution requirements (e.g., different crops or seeding rates, different seeding implement widths, etc.).

Figure 8:
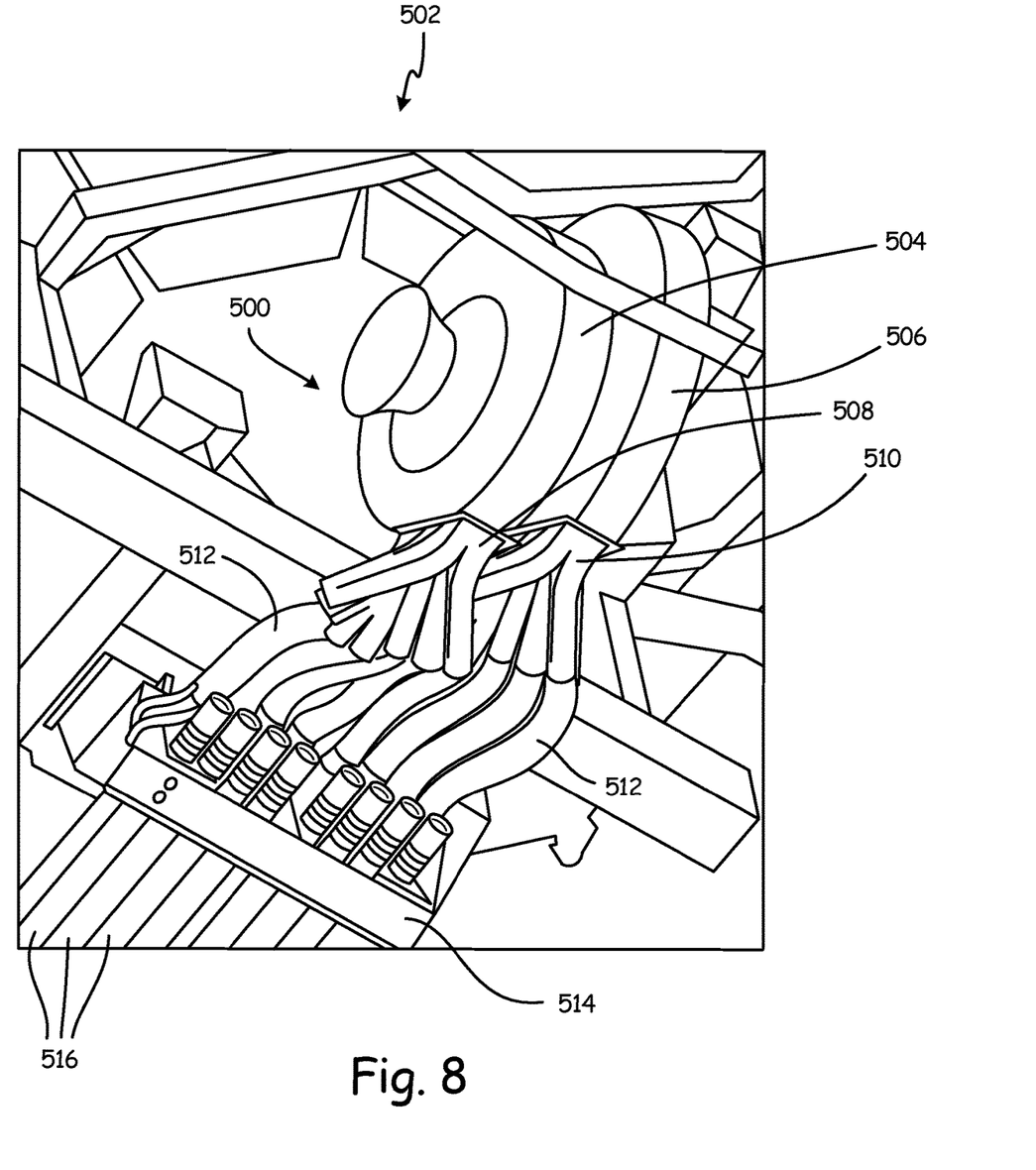
FIG. 8 illustrates a bottom perspective view of a pneumatic distribution system mounted on an agricultural vehicle, in one example.

FIG. 8 illustrates a bottom perspective view of a pneumatic distribution system 500 mounted on an agricultural vehicle 502, in one example. System 500 includes a plurality of air sources 504 and 506 (e.g., centrifugal fans). A first air flow assembly 508 is coupled to air source 504 and a second air flow assembly 510 is coupled to air source 506. A first set of conduits 512 couple each air flow assembly 508, 510 to a metering system 514. In FIG. 8, the conduits coupled to assembly 508 have been omitted for illustration purposes. A second set of conduits 516 provide distribution paths from the metering system 514.

Figure 9:
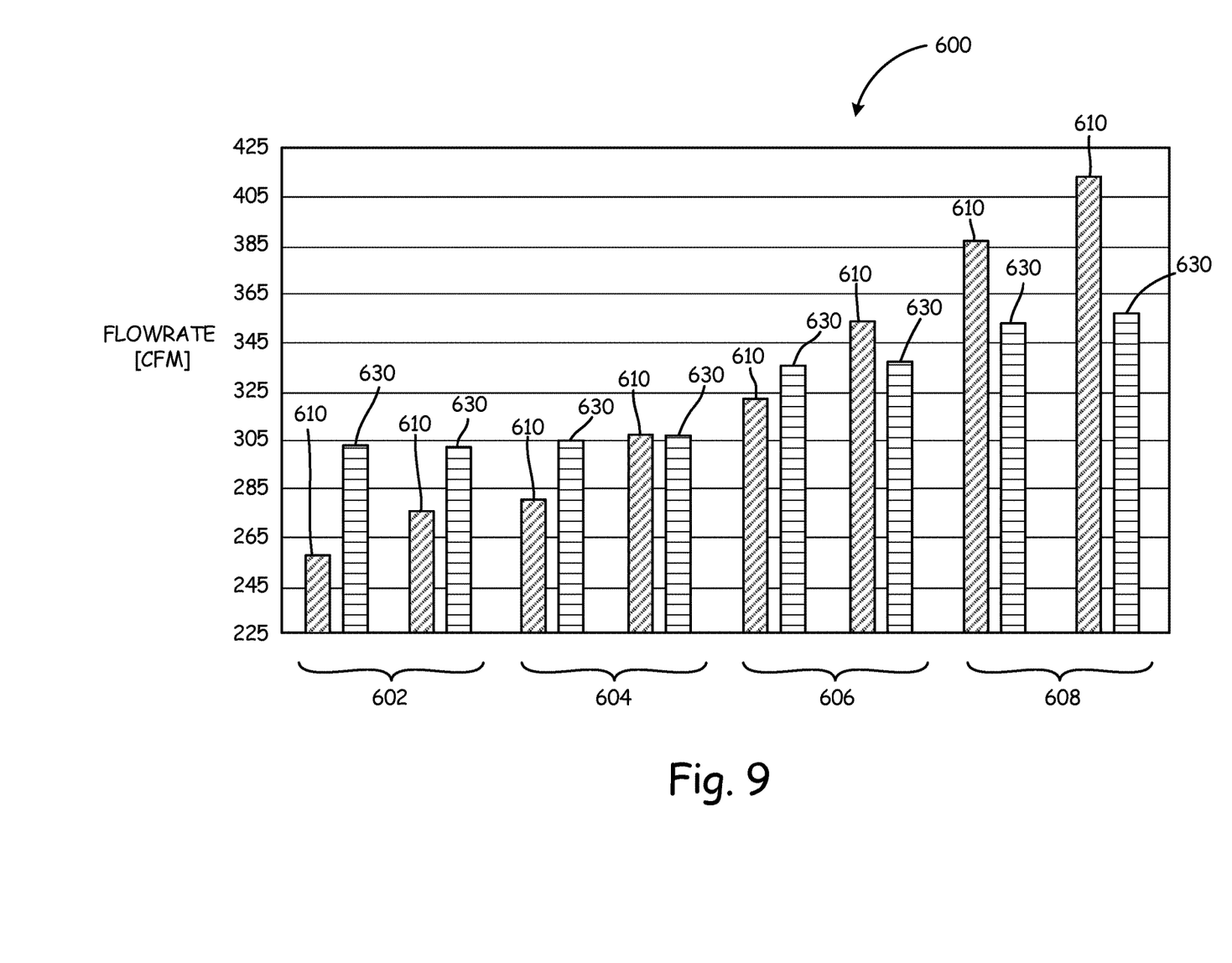
FIG. 9 is a bar chart illustrating flow rates for several example pneumatic distribution systems.

For sake of illustration, but not by limitation, FIG. 9 is a bar chart illustrating flow rates, in cubic feet per minute (CFM), for several example pneumatic distribution systems that utilize a substantially similar air source. A first group of bars 602 represent a first distribution line length (e.g., fifty eight foot distribution line from fan outlet to row unit), a second group of bars 604 represent a second distribution line length (e.g., forty nine foot distribution line from fan outlet to row unit), a third group of bars 606 represent a third distribution line length (e.g., thirty seven foot distribution line from fan outlet to row unit), and a fourth group of bars 608 represent a fourth distribution line length (e.g., twenty three foot distribution line from fan outlet to row unit).

Each group of bars includes a first bar 610 and a second bar 630. The first bar 610 represents a first distribution system that utilizes a large plenum box that equalizes air pressures at the distribution line inlets through substantial mixing of the air prior to segmentation into the individual distribution lines. The second bar 630 represents a second distribution system that utilizes an air flow assembly substantially similar to the example shown in FIG. 3.

As shown in FIG. 9, first distribution system exhibits a greater difference in flow rate between the longest and shorts distribution lines. That is, the flow rate in the shortest distribution line is approximately sixty-three percent of the flow rate in the longest distribution line. However, the flow rates in the second distribution system is significantly more similar (i.e., flow rates in the shortest distribution lines are eighty-six percent compared to the longest distribution lines). Additionally, compared to the first distribution system, the example second distribution system can reduce pressure loss by approximately forty percent, and reduce housing cut-off flow circulation, which can improve fan efficiency.

It should also be noted that the different examples described herein can be combined in different ways. That is, parts of one or more examples can be combined with parts of one or more other examples. All of this is contemplated herein.

Example 1 is a pneumatic distribution system for pneumatically distributing material in an agricultural vehicle, the pneumatic distribution system comprising an air source having an outlet with different air pressures defining a pressure gradient across the outlet, and a plurality of inlet ports configured to receive air from the outlet for a plurality of distribution streams, comprising at least a first distribution stream with a first pressure loss value and a second distribution stream with a second pressure loss value that is greater than the first pressure loss value, wherein the inlet ports for the first and second distribution streams are located relative to the pressure gradient such that the second distribution stream receives a higher air pressure than the first distribution stream.

Example 2 is the pneumatic distribution system of any or all previous examples, wherein the air source comprises a centrifugal fan.

Example 3 is the pneumatic distribution system of any or all previous examples, wherein the air pressure at each inlet port is proportional to the pressure loss value of the corresponding distribution stream.

Example 4 is the pneumatic distribution system of any or all previous examples, wherein the plurality of distribution streams comprise a plurality of lines that distribute air from the outlet to a plurality of end points.

Example 5 is the pneumatic distribution system of any or all previous examples, wherein each of the plurality of inlet ports is configured to receive air along the pressure gradient such that, at the plurality of end points, the air flow rates in the plurality of distribution streams are substantially equal.

Example 6 is the pneumatic distribution system of any or all previous examples, wherein each of the lines comprises a separate conduit fluidically coupled to one of the inlet ports.

Example 7 is the pneumatic distribution system of any or all previous examples, wherein the agricultural vehicle comprises an air seeder, and the plurality of end points comprise row units on the air seeder.

Example 8 is the pneumatic distribution system of any or all previous examples, wherein each conduit couples the respective inlet port to a metering system configured to meter material into the respective distribution stream.

Example 9 is the pneumatic distribution system of any or all previous examples, wherein the metering system comprises a volumetric meter.

Example 10 is the pneumatic distribution system of any or all previous examples, wherein the inlet ports for the first and second distribution streams have a substantially similar cross-sectional area.

Example 11 is the pneumatic distribution system of any or all previous examples, wherein the inlet ports for the first and second distribution streams have different cross-sectional areas.

Example 12 is the pneumatic distribution system of any or all previous examples, wherein the plurality of inlet ports are fluidically coupled directly to the outlet.

Example 13 is the pneumatic distribution system of any or all previous examples, wherein the plurality of inlet ports are spaced apart from the outlet.

Example 14 is the pneumatic distribution system of any or all previous examples further comprising a plenum chamber that is located between the outlet and the plurality of inlet ports and configured to receive the air from the outlet for the plurality of distribution streams.

Example 15 is the pneumatic distribution system of any or all previous examples, wherein the inlet ports for the first and second distribution streams are fluidically coupled to the plenum chamber.

Example 16 is an agricultural implement comprising a product source, a metering system configured to meter product from the product source, and a pneumatic distribution system configured to pneumatically distribute the metered product to a plurality of end points on the agricultural implement, the pneumatic distribution system comprising an air source having an outlet with different air pressure zones defining a pressure gradient across the outlet, and a plurality of distribution lines configured to provide air streams to the plurality of end points, the plurality of distribution lines comprising at least a first distribution line and a second distribution line that has longer length than the first distribution line, wherein the second distribution line is configured to receive higher air pressure compared to the first distribution line.

Example 17 is the agricultural implement of any or all previous examples, wherein the agricultural vehicle comprises an air seeder, the air source comprises a centrifugal fan, and the plurality of end points comprise row units on the air seeder.

Example 18 is the agricultural implement of any or all previous examples, wherein the outlet comprises a fan axis, and an inlet for the second distribution line is located further away from the fan axis than an inlet for the first distribution line.

Example 19 is an agricultural pneumatic distribution system comprising a fan assembly having an outlet, and a plurality of conduits, each configured to receive an air stream for conveying an agricultural material to an end point, wherein a first one of conduits is positioned such that it receives a first air stream from a high pressure area of the outlet and a second one of the conduits is positioned such that it receives a second air stream from a low pressure area along the pressure gradient, wherein the first conduit is associated with a distribution line having a higher pressure drop than a distribution line associated with the second conduit.

Example 20 is the pneumatic distribution system of any or all previous examples, wherein the fan assembly comprises a centrifugal fan having a fan axis, and wherein a first inlet for the first conduit is located further away from the fan axis than a second inlet for the second conduit.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A pneumatic distribution system for an agricultural machine, the pneumatic distribution system comprising:
   an air source having an outlet;
   an assembly configured to receive agricultural material from a material source; and
   a first distribution line comprising one or more conduits configured to convey a portion of the agricultural material to a first device associated with the agricultural machine, wherein the first distribution line comprises a first inlet that receives a first air stream from a first area of the outlet; and
   a second distribution line comprising one or more conduits configured to convey a portion of the agricultural material to a second device associated with the agricultural machine, wherein the second distribution line comprises a second inlet that receives a second air stream from a second area of the outlet having a lower air pressure than the first area, and wherein the first distribution line has a first pressure drop between the first inlet and the first device that is greater than a second pressure drop between the second inlet of the second distribution line and the second device.

2. The pneumatic distribution system of claim 1, wherein the air source comprises a centrifugal fan having a fan axis, and wherein the first inlet is located further away from the fan axis than the second inlet.

3. The pneumatic distribution system of claim 1, wherein the agricultural material comprises one of seed or fertilizer.

4. The pneumatic distribution system of claim 1, and further comprising a fixed portion forming a plurality of passageways with inlet apertures configured such that the first inlet receives the first air stream from the first area of the outlet and the second inlet receives the second air stream from the second area of the outlet.

5. The pneumatic distribution system of claim 4, wherein each passageway of the plurality of passageways has a substantially similar cross-sectional area.

6. The pneumatic distribution system of claim 4, wherein the plurality of passageways have different cross-sectional areas.

7. The pneumatic distribution system of claim 4 the inlet apertures each face the outlet of the air source.

8. The pneumatic distribution system of claim 1, wherein the first and the second distribution lines, at the respective first and second devices, have substantially similar air flow rates.

9. The pneumatic distribution system of claim 8, wherein the first and second devices each comprise a row unit configured to disperse the agricultural material in a row.

10. The pneumatic distribution system of claim 1, wherein the material source comprises a metering device configured to meter the agricultural material into the assembly.

11. An agricultural pneumatic distribution system comprising:
- an air source having an outlet; and
- a plurality of conduits, each configured to receive an air stream from the outlet for conveying an agricultural material, wherein
  - a first one of conduits corresponds to a first distribution line with a first inlet and is positioned to receive a first air stream from a first area of the outlet,
  - a second one of the conduits corresponds to a second distribution line with a second inlet and is positioned to receive a second air stream from a second area of the outlet having a lower air pressure than the first area,
  - the first distribution line is configured to convey a first portion of agricultural material using the first air stream to a first row unit configured to disperse the first portion of agricultural material in a first row,
  - the second distribution line is configured to convey a second portion of agricultural material using the second air stream to a second row unit configured to disperse the second portion of agricultural material in a second row, and
  - the first distribution line has a higher pressure drop than the second distribution line from each associated inlet to each associated row unit respectively.

12. The agricultural pneumatic distribution system of claim 11, wherein the air source comprises a centrifugal fan having a fan axis, and wherein a first inlet for the first conduit is located further away from the fan axis than a second inlet for the second conduit.

13. The agricultural pneumatic distribution system of claim 11, wherein the agricultural material comprises one of seed or fertilizer.

14. The agricultural pneumatic distribution system of claim 11, further comprising a fixed portion having a plurality of passageways with inlet apertures configured to separate the air stream such that the first one of the conduits receives the first air stream from the first area of the outlet and the second one of the conduits receives the second air stream from the second area of the outlet.

15. The agricultural pneumatic distribution system of claim 14, wherein the plurality of passageways each have a substantially similar cross-sectional area.

16. The agricultural pneumatic distribution system of claim 14, wherein each passageway has a different cross-sectional area than another one of the passageways.

17. An agricultural machine comprising:

a metering system configured to meter an agricultural product; and an agricultural pneumatic distribution system configured to pneumatically distribute the metered agricultural product to a plurality of row units on the agricultural machine, the pneumatic distribution system comprising:

an air source having an outlet; and a plurality of conduits, each configured to receive an air stream from the outlet for conveying the agricultural product to at least one of the row units, wherein a first one of conduits corresponds to a first distribution line with a first inlet and is positioned such that the first conduit receives a first air stream from a first area of the outlet, a second one of the conduits corresponds to a second distribution line with a second inlet and is positioned such that the second conduit receives a second air stream from a second area of the outlet having a lower air pressure than the first area, and the first distribution line has a higher pressure drop than the second distribution line from each associated inlet to each associated row unit respectively.

18. The agricultural machine of claim 17, wherein the air source comprises a centrifugal fan having a fan axis, and wherein a first inlet for the first conduit is located further away from the fan axis than a second inlet for the second conduit.

19. The agricultural machine of claim 17, wherein the first and the second distribution lines, at the respective row units, have substantially similar air flow rates.

* * * * *